US011163568B2

(12) United States Patent
Islam et al.

(10) Patent No.: US 11,163,568 B2
(45) Date of Patent: Nov. 2, 2021

(54) IMPLEMENTING WRITE PORTS IN REGISTER-FILE ARRAY CELL

(71) Applicant: International Business Machines Corporation, Armonk, NY (US)

(72) Inventors: Saiful Islam, Austin, TX (US); Sam G. Chu, Round Rock, TX (US); Dung Q. Nguyen, Austin, TX (US); Binglong Zhang, Austin, TX (US); Howard Levy, Austin, TX (US); David R. Terry, Austin, TX (US); Steven J. Battle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/123,608

(22) Filed: Sep. 6, 2018

(65) Prior Publication Data
US 2020/0081713 A1 Mar. 12, 2020

(51) Int. Cl.
*G06F 9/30* (2018.01)
*G06F 12/02* (2006.01)

(52) U.S. Cl.
CPC ...... *G06F 9/30141* (2013.01); *G06F 9/30105* (2013.01); *G06F 12/02* (2013.01)

(58) Field of Classification Search
CPC .. G06F 9/30141; G06F 12/02; G06F 9/30105; G06F 12/0284; G06F 2212/206; G06F 2212/1028; G06F 2212/1041; G06F 2212/1024; Y02D 10/00
See application file for complete search history.

(56) References Cited

U.S. PATENT DOCUMENTS

| 5,644,780 | A | * | 7/1997 | Luick | G06F 9/3012 |
| | | | | | 712/23 |
| 6,219,756 | B1 | * | 4/2001 | Kasamizugami | G06F 9/30141 |
| | | | | | 365/189.02 |
| 7,243,209 | B2 | | 7/2007 | Chu et al. | |
| 7,663,963 | B2 | | 2/2010 | Chu et al. | |
| 9,891,924 | B2 | | 2/2018 | Abdallah | |
| 2001/0010075 | A1 | * | 7/2001 | Tremblay | G06F 9/30105 |
| | | | | | 712/228 |

(Continued)

OTHER PUBLICATIONS

Tseng et al., Banked Multiported Register Files for High-Frequency Superscalar Microprocessors, In ACM SIGARCH Computer Architecture News, vol. 31, No. 2, pp. 62-71, Jun. 2003.

(Continued)

*Primary Examiner* — Charles Rones
*Assistant Examiner* — Tong B. Vo
(74) *Attorney, Agent, or Firm* — Van Leeuwen & VanLeeuwen; Nathan M. Rau

(57) ABSTRACT

An approach is provided in which a system writes a set of data into a register file entry that includes a first memory array and a second memory array. The register file entry also includes a set of first write ports corresponding to the first memory array and a set of second write ports corresponding to the second memory array. The system configures a selection bit based on determining that a selected one of the set of first write ports is utilized to store the set of data in the first memory array. In turn, the system reads the set of data out of the first memory array based on the configured selection bit.

17 Claims, 6 Drawing Sheets

(56) References Cited

U.S. PATENT DOCUMENTS

| | | | | |
|---|---|---|---|---|
| 2001/0044882 A1* | 11/2001 | Pille | ............... | G11C 7/1012 |
| | | | | 711/149 |
| 2006/0253659 A1* | 11/2006 | Greenfield | ............ | G06F 9/3875 |
| | | | | 711/149 |
| 2011/0078414 A1* | 3/2011 | Olson | ............... | G11C 8/16 |
| | | | | 712/208 |
| 2013/0339649 A1 | 12/2013 | Hsu et al. | | |
| 2015/0193233 A1* | 7/2015 | Eberle | ............... | G06F 9/30007 |
| | | | | 712/210 |

OTHER PUBLICATIONS

Saghir et al., A Configurable Multi-Ported Register File Architecture for Soft Processor Cores, In International Workshop on Applied Reconfigurable Computing, pp. 14-25, Springer, Berlin, Heidelberg, Mar. 2007.

Park et al., Reducing Register Ports for Higher Speed and Lower Energy, 2002 (MICRO-35) Proceedings, 35th Annual IEEE/ACM International Symposium on Microarchitecture, pp. 171-182, IEEE., 2002.

* cited by examiner

IMPLEMENTING WRITE PORTS IN REGISTER-FILE ARRAY CELL

BACKGROUND

In a low-power (~0.7 volts) and high frequency (~4 GHz) design, a typical register file array supports no more than six write ports due to, for example, high capacitance, cell writeability, and etcetera. For designs requiring more than six write ports in a cell, system designers are required to implement complex architectures that may or may not meet design requirements. One architecture implement involves inserting multiplexers into each cell to multiplex multiple input ports. The multiplexer implementation, however, requires more area and, more importantly, is extremely slow in write access time.

An alternative to the multiplexer implementation is a "double pumps write" architecture implementation. In this implementation, half of the write ports are utilized in one phase of the clock and the other half of the write ports are utilized in the other phase of the clock. As can be imagined, the double pumps write implementation is complex and requires extreme design considerations to align the clocks of two write phases. In short, neither the multiplexer implementation nor the double pumps write implementation are ideal solutions for low power, high frequency designs requiring a large number of write ports for their memory cells.

BRIEF SUMMARY

According to one embodiment of the present disclosure, an approach is provided in which a system writes a set of data into a register file entry that includes a first memory array and a second memory array. The register file entry also includes a set of first write ports corresponding to the first memory array and a set of second write ports corresponding to the second memory array. The system configures a selection bit based on determining that a selected one of the set of first write ports is utilized to store the set of data in the first memory array. In turn, the system reads the set of data out of the first memory array based on the configured selection bit.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
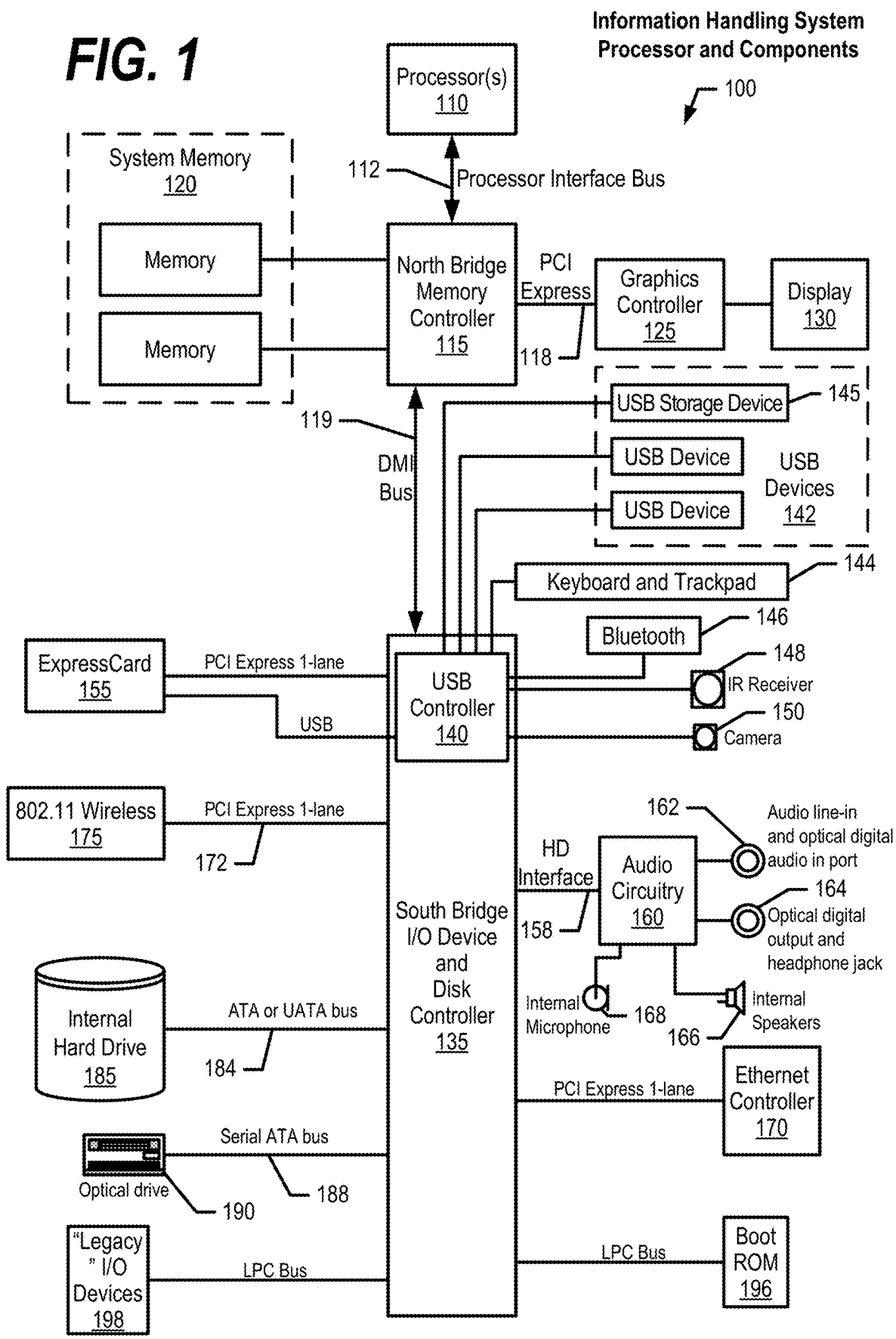
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
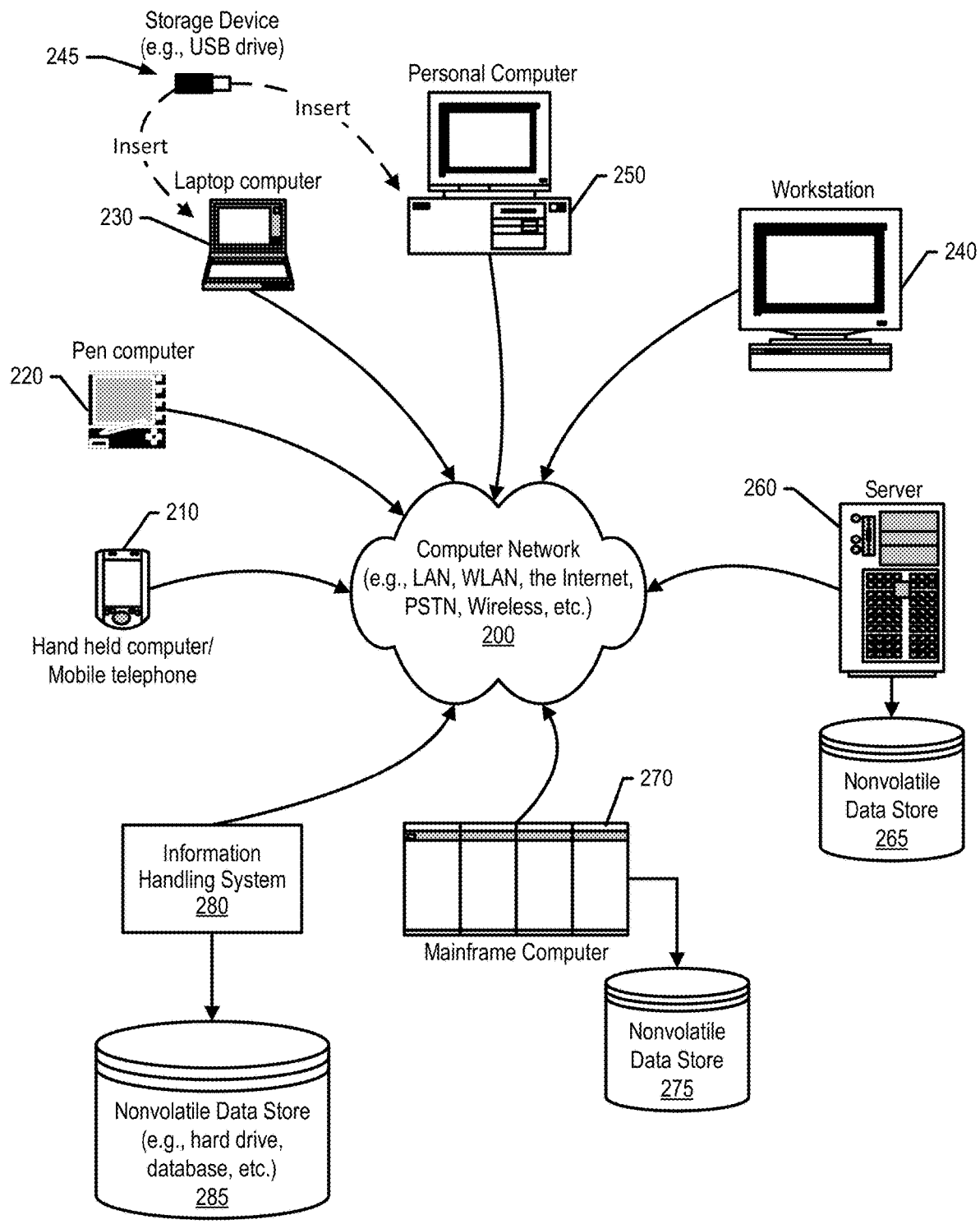
FIG. 2 provides an extension of the information handling system environment shown in FIG. 1 to illustrate that the methods described herein can be performed on a wide variety of information handling systems which operate in a networked environment

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 6 disclose an approach of a large write ported cell (10 write ports) that is split into two smaller ported cells with an additional selection bit cell and a 2:1 multiplexer to perform a read operation. As discussed herein, this approach does not add write access penalties in timing, is a much simpler in design than traditional implementations, consumes less power, and requires less overall area.

In one embodiment, a history buffer microarchitecture includes a 20-entry/80 bits per entry array. Each entry is 8-byte wide with each byte having 8 data and 2 ECC (error correcting code) bits. As such, each history buffer entry requires 10 write ports and one read port. As discussed earlier, due to constraints of cell write margin and write access timing, traditional dual-ended 10 write port cells are not supported in low voltage, high speed CPU's. To overcome this limitation, each history buffer entry (register file) includes a combination of 5-port dual ended write cells, two register file arrays, "last write selection logic," and one read port that reads data from one of the two register file arrays based on the last write selection logic. As discussed herein, a register file entry is any type of memory cell, which includes a history buffer entry.

Figure 3:
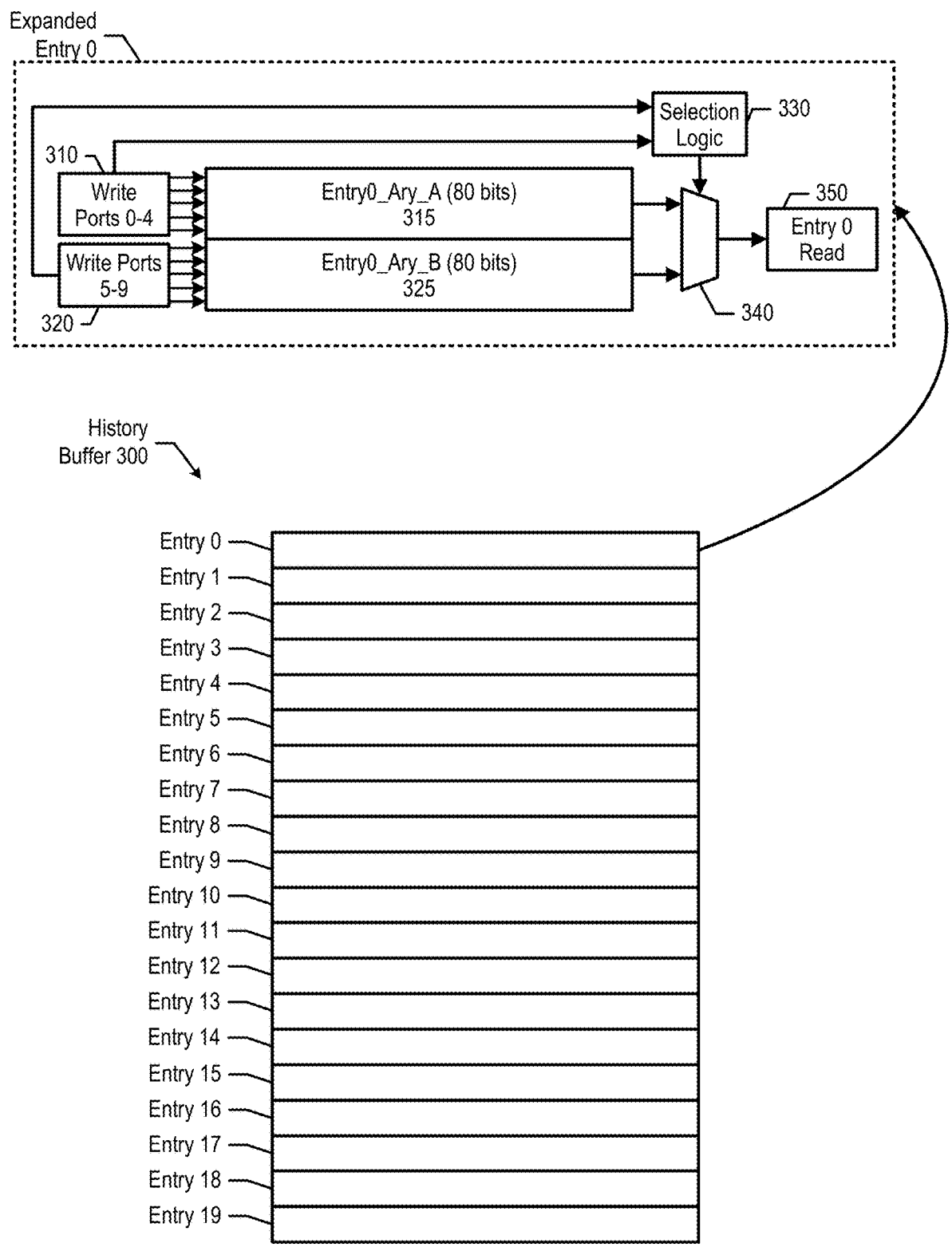
FIG. 3 is an exemplary diagram depicting a history buffer that includes multi-array history buffer entries with corresponding selection and multiplexer logic.

FIG. 3 is an exemplary diagram depicting a history buffer that includes multi-array history buffer entries with corresponding selection and multiplexer logic.

History buffer 300 is included in processor(s) 110 and includes entry 0, 1, 2, 3, 4, 5, 6, 7, 8, 9, 10, 11, 12, 13, 14, 15, 16, 17, 18, and 19, which are each independently addressable. History buffer 300 may include more or less entries than what is shown in FIG. 3. Each of the history buffer entries is a multi-array history buffer entry that supports a large number of write ports. Expanded entry 0 is an expanded diagram of entry 0. Each of entries 0-19 also include the same configuration as expanded entry 0.

Write ports 0-4 310 couple to entry 0 array A 315, and write ports 5-9 320 couple to entry 0 array B 325. Selection logic 330 tracks which of write ports 0-4 310 or write ports 5-9 320 were involved in a last write cycle (see FIG. 4 and corresponding text for further details). As such, selection logic 330 configures multiplexer 340 to read out of the appropriate entry 0 array A 315 or entry 0 array B 325 and provide the data to entry 0 read logic 350. For example, when data is written into entry 0 through write port 3, selection logic 330 configures multiplexer 340 so that on the next read cycle, the data is read from entry 0 array A 315. Likewise, when data is written into entry 0 through write port 7, selection logic 330 configures multiplexer 340 so that the next ready cycle is read from entry 0 array B 325.

Figure 4:
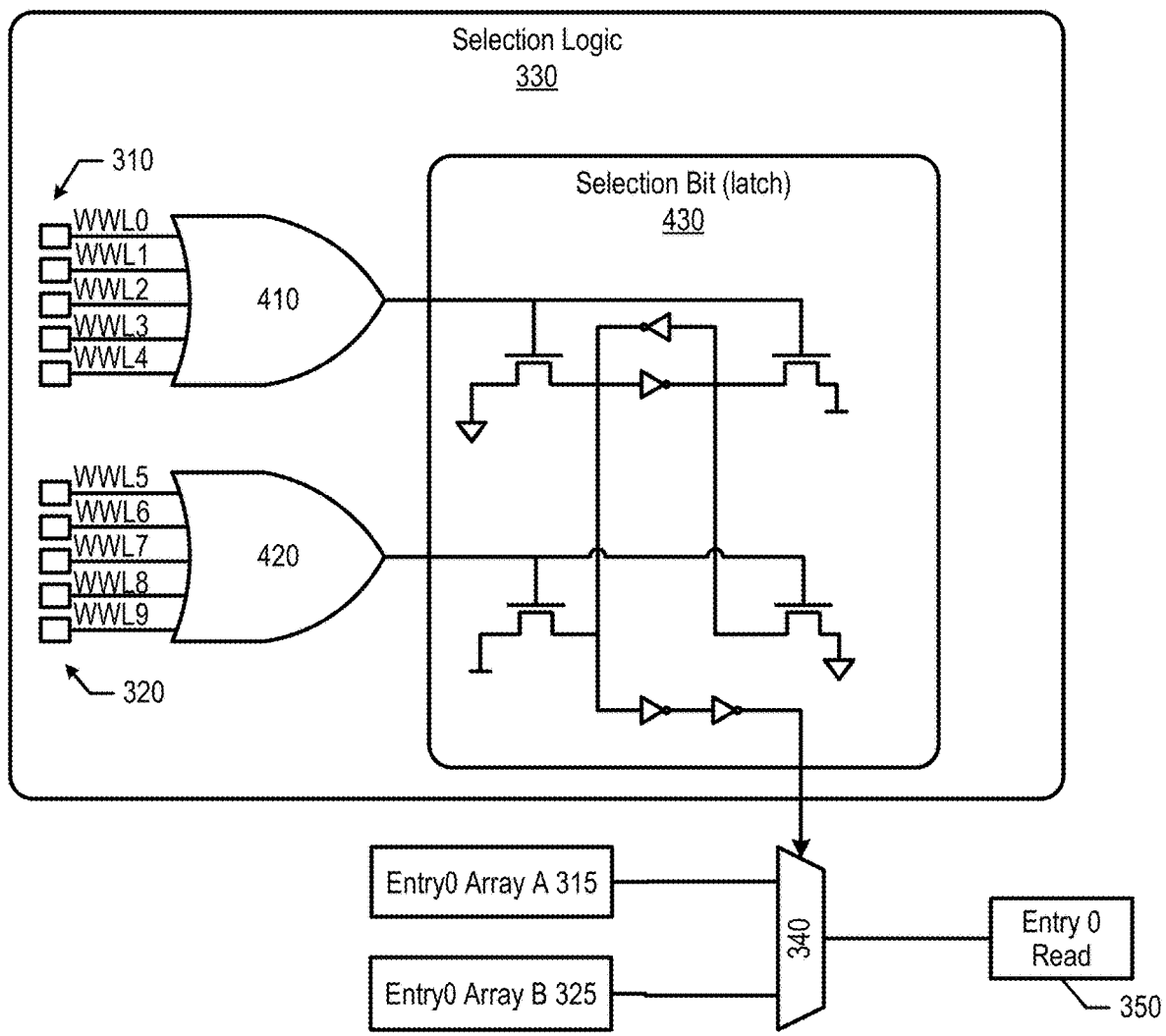
FIG. 4 is an exemplary diagram depicting a hardware solution to capture a last write port selection.

In one embodiment, each selection logic 330 uses a 2-write ported cell instead of a 1-write ported cell to circumvent using 5-way OR logic in selection logic 330 (see FIG. 4 and corresponding text for further details).

FIG. 4 is an exemplary diagram depicting a hardware solution to capture a last write port selection. In one embodiment, selection logic 330 includes OR logic 410 that supports write ports 310 (WWL0-WWL4 are decoded write address locations), and OR logic 420 that supports write ports 320 (WWL5-WWL9 are decoded write address locations). The output of OR logic 410 and 420 feeds into selection bit 430 (e.g., a latch, 2-write ported cell, etc.), which stores a value (0 or 1) based on whether the output of 410 is active or the output of 420 is active. In turn, the output of selection logic 330 controls multiplexer 340, which selects either entry 0 array A 315 or array B 325 as an input to feed into entry 0 read logic 350.

In one embodiment, the output of selection bit 430 controls one byte of data when byte write is enabled, or controls the whole set of data in array A 315 or array B 320 when byte write is not enabled.

Figure 5:
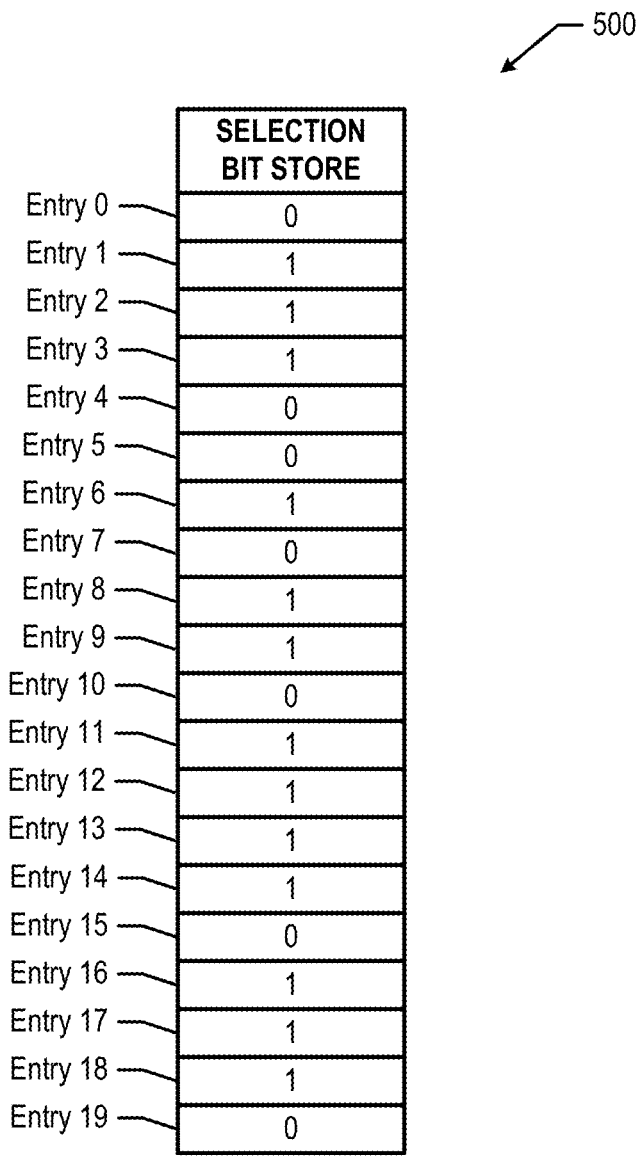
FIG. 5 is an exemplary diagram depicting a storage area that individually stores last write port selection information for each history buffer entry.

FIG. 5 is an exemplary diagram depicting a storage area that individually stores last write port selection information for each history buffer entry. Selection bit store 500, such as cache, shows that processor(s) 110 tracks independent selection bit values for each of the history buffer entries in history buffer 300. In one embodiment, the selection bit values are stored in hardware (FIG. 5). In another embodiment, the selection bits are stored in software, such as a cache or data storage area. As a result, each of the multi-array history buffer entries functions independently.

Figure 6:
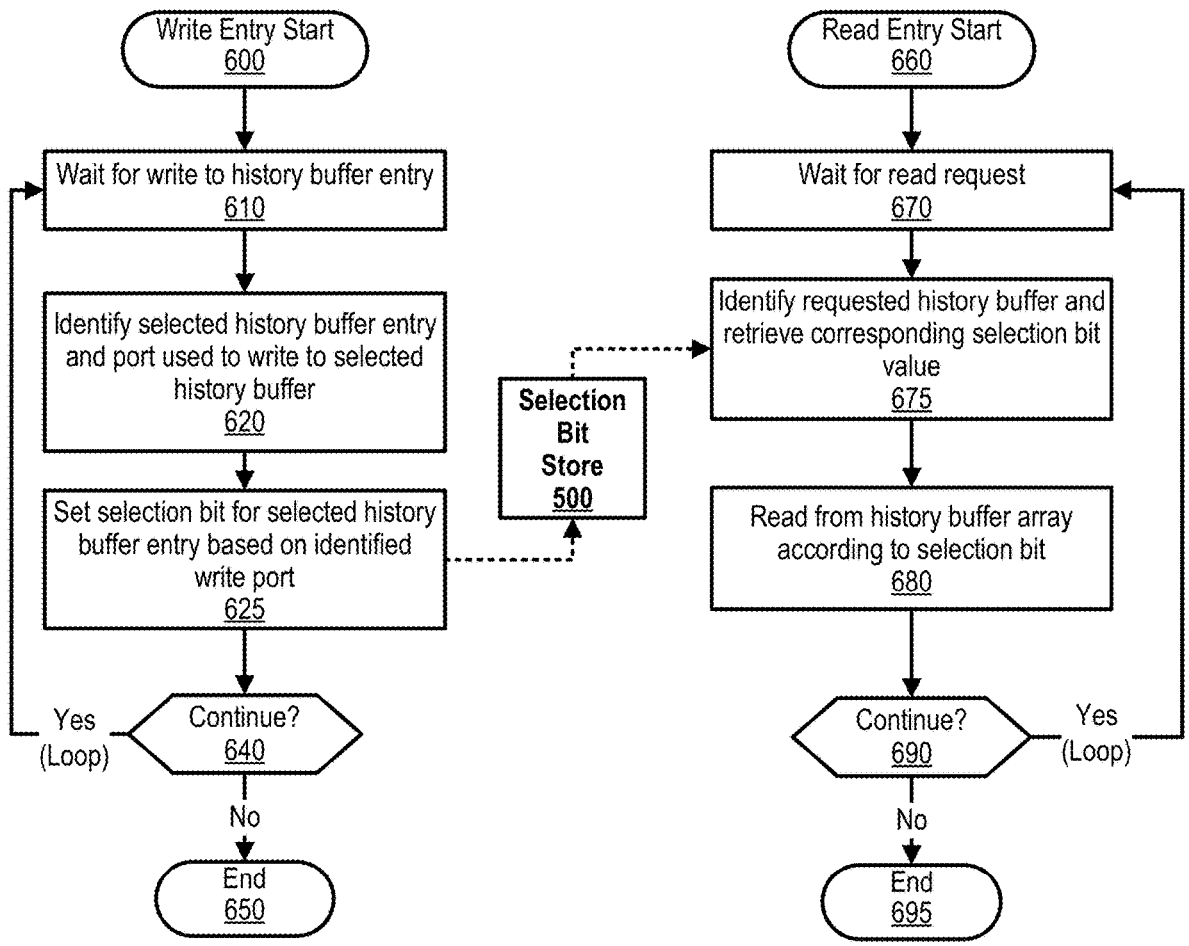
FIG. 6 is an exemplary flowchart showing steps taken by a write process to store write port selection information into a memory array and a read process using the stored write port selection information to read data out of the memory array.

FIG. 6 is an exemplary flowchart showing steps taken by a write process to store write port selection information into a memory array and a read process using the stored write port selection information to read data out of the memory array. FIG. 6 write entry processing commences at 600 whereupon, at step 610, the process waits for write to a history buffer entry (e.g., entry 0). At step 620, the process identifies the selected history buffer entry and port (e.g., write port 6) used to write to the selected history buffer entry.

At step 625, the process sets the selection bit (e.g., 0 or 1) for the selected history buffer entry in selection bit store 500 based on the identified write port. The process determines as to whether to continue (decision 640). If the process should continue, then decision 640 branches to the 'yes' branch which loops back to wait for more write operations to the history buffer. This looping continues until the process should terminate, at which point decision 640 branches to the 'no' branch exiting the loop. FIG. 6 processing thereafter ends at 650.

FIG. 6 read processing commences at 660 whereupon, at step 670, the process waits for a read request. At step 675, the process identifies the requested history buffer entry (e.g., entry 0) and retrieves the corresponding selection bit value from selection bit store 500. At step 680, the process reads from the correct history buffer array (e.g., array A or array B) according to the selection bit.

The read process determines as to whether to continue (decision 690). If the process should continue, then decision 690 branches to the 'yes' branch which loops back to wait for another read request. This looping continues until the process should terminate, at which point decision 690 branches to the 'no' branch exiting the loop. FIG. 6 read processing thereafter ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure.

Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   writing a set of data into a single register file entry, wherein the single register file entry comprises:
      a first memory array comprising at least five first write ports and a first read port, wherein a first output of the first read port is based on one of the at least five first write ports; and
      a second memory array comprising at least five second write ports and a second read port, wherein a second output of the second read port is based on one of the at least five second write ports;
   configuring a selection bit based on determining that a selected one of the at least five first write ports is utilized to store the set of data in the first memory array; and
   reading the set of data out of the first memory array based on the configured selection bit.

2. The method of claim 1 further comprising:
   utilizing at least one of the at least five second write ports to write a different set of data into the single register file entry, wherein the different set of data is stored in the second memory array;

re-configuring the selection bit based on determining that the selected second write port is utilized to store the different set of data in the second memory array; and
reading the different set of data out of the second memory array based on the reconfigured selection bit.

3. The method of claim 1 wherein the single register file entry is a history buffer entry included in a history buffer comprising a plurality of history buffer entries.

4. The method of claim 3 wherein each of the plurality of history buffer entries corresponds to a different one of a plurality of address locations, and wherein the first memory array and the second memory array each corresponds to a same one of the plurality of address locations corresponding to the history buffer entry.

5. The method of claim 1 further comprising:
selecting one of a plurality of multiplexer inputs based on the configured selection bit, wherein the plurality of multiplexer inputs comprise a first input that couples to the first memory array and a second input that couples to the second memory array.

6. The method of claim 1 further comprising:
decoding a write address location corresponding to the selected first write port; and
wherein the determining that the selected first write port was utilized to store the set of data in the first memory array is based on the decoded write address location.

7. A system comprising:
one or more processors; and
a history buffer accessible by the one or more processors, wherein the history buffer comprises a plurality of history buffer entries, each one of the plurality of history buffer entries further comprising:
a first memory array comprising a first read port and at least five first write ports to write a set of data into the first memory array, wherein a first output of the first read port is based on one of the at least five first write ports;
a second memory array comprising a second read port and at least five second write ports to write the set of data into the second memory array, wherein a second output of the second read port is based on one of the at least five second write ports;
a selection bit that stores a selection value based on a last write operation between the at least five first write ports and the at least five second write ports; and
a multiplexer that reads the set of data out of a selected history buffer entry based on the selection bit.

8. The system of claim 7 wherein each of the plurality of history buffer entries corresponds to a different one of a plurality of address locations, and wherein the first memory array and the second memory array each corresponds to a same one of the plurality of address locations corresponding to the history buffer entry.

9. The system of claim 8 wherein each one of the plurality of history buffer entries supports at least 10 write ports.

10. The system of claim 7 further comprising:
the first read port on the first memory array that connects to a first input of the multiplexer; and
the second read port that connects to a second input of the multiplexer.

11. An information handling system comprising:
one or more processors;
a memory coupled to at least one of the processors;
a set of computer program instructions stored in the memory and executed by at least one of the processors in order to perform actions of:
writing a set of data into a single register file entry, wherein the single register file entry comprises:
a first memory array comprising at least five first write ports and a first read port, wherein a first output of the first read port is based on one of the at least five first write ports; and
a second memory array comprising at least five second write ports and a second read port, wherein a second output of the second read port is based on one of the at least five second write ports;
configuring a selection bit based on determining that a selected one of the at least five first write ports is utilized to store the set of data in the first memory array; and
reading the set of data out of the first memory array based on the configured selection bit.

12. The information handling system of claim 11 wherein the processors perform additional actions comprising:
utilizing at least one of the at least five second write ports to write a different set of data into the single register file entry, wherein the different set of data is stored in the second memory array;
re-configuring the selection bit based on determining that the selected second write port is utilized to store the different set of data in the second memory array; and
reading the different set of data out of the second memory array based on the reconfigured selection bit.

13. The information handling system of claim 11 wherein the single register file entry is a history buffer entry included in a history buffer comprising a plurality of history buffer entries.

14. The information handling system of claim 13 wherein each of the plurality of history buffer entries corresponds to a different one of a plurality of address locations, and wherein the first memory array and the second memory array each corresponds to a same one of the plurality of address locations corresponding to the history buffer entry.

15. The information handling system of claim 14 wherein each one of the plurality of history buffer entries supports at least 10 write ports.

16. The information handling system of claim 11 wherein the processors perform additional actions comprising:
selecting one of a plurality of multiplexer inputs based on the configured selection bit, wherein the plurality of multiplexer inputs comprise a first input that couples to the first memory array and a second input that couples to the second memory array.

17. The information handling system of claim 11 wherein the processors perform additional actions comprising:
decoding a write address location corresponding to the selected first write port; and
wherein the determining that the selected first write port was utilized to store the set of data in the first memory array based on the decoded write address location.

* * * * *